G. H. WALKER.
DYNAMOMETER.
APPLICATION FILED OCT. 6, 1916.

1,249,261.

Patented Dec. 4, 1917.

Witnesses
M. E. McDade
C. D. Kesler

Inventor
George H. Walker
by
James L. Norris
Attorney

UNITED STATES PATENT OFFICE.

GEORGE HENRY WALKER, OF WORCESTER, ENGLAND, ASSIGNOR TO HEENAN & FROUDE, LIMITED, OF MANCHESTER, ENGLAND.

DYNAMOMETER.

1,249,261. Specification of Letters Patent. Patented Dec. 4, 1917.

Application filed October 6, 1916. Serial No. 124,131.

*To all whom it may concern:*

Be it known that I, GEORGE HENRY WALKER, a British subject, residing at Worcester, county of Worcester, England, have invented certain new and useful Improvements in Dynamometers, of which the following is a specification.

This invention relates to improvements in rotary absorption dynamometers or similar brakes.

In dynamometers or similar brakes whether of hydraulic, electric or other form, the apparatus must assume large dimensions when the power to be absorbed is developed at a low speed of rotation, and for any given power the required effective diameter of the rotating element increases rapidly as the speed of rotation of the prime mover diminishes.

The object of the present invention is to provide means whereby the rotor and consequently the whole apparatus may be designed to have considerably smaller dimensions and less weight than has been required up to the present to absorb a given power.

Attempts have been made to reduce the size of the rotor by connecting the prime mover to a shaft mounted on an independent base and transmitting the power through gear to the shaft of the rotor. In such cases however any loss due to transmission is not registered on the measuring arrangement of the apparatus.

The invention consists in connecting the shaft to which the prime mover is coupled to the shaft of the rotor, armature or other power absorbing element through suitable gear located within the stator casing, so that the speed of the shaft of the rotor, armature or other power absorbing element is greater than the speed of the shaft of the prime mover, the primary shaft coupled to the prime mover and the gear, the power absorbing portion of the dynamometer and the casing together swiveling about the axis of the shaft, whereby the friction resistance imposed by the gear will be transmitted to the registering device.

The invention will be described with reference to the accompanying drawings.

Figure 1:
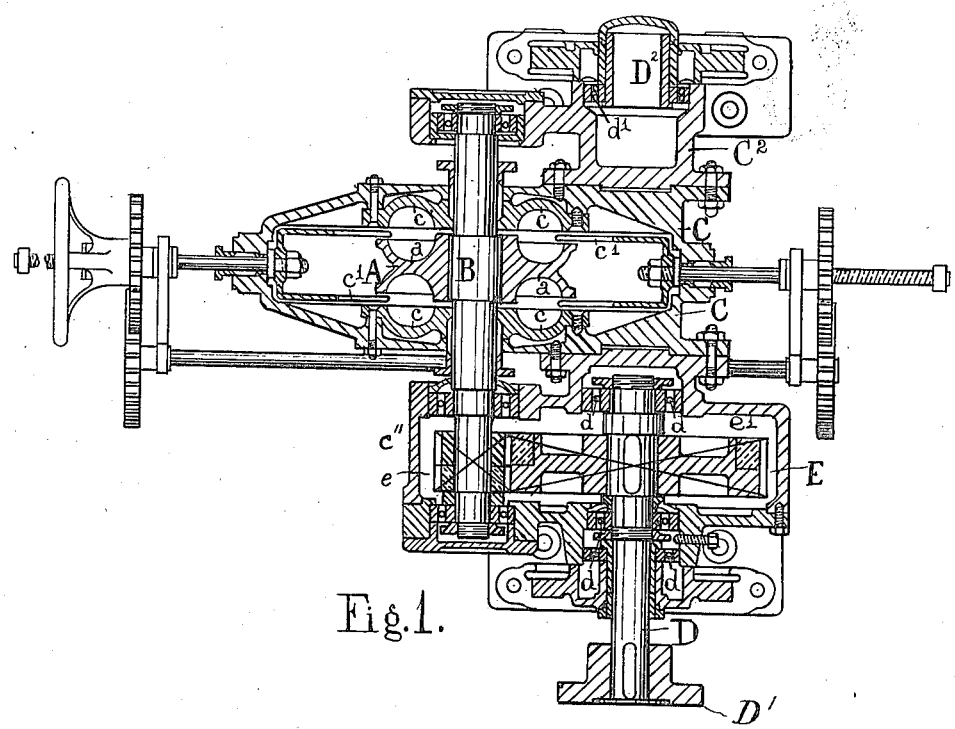

Figure 1. is a horizontal section through a hydraulic dynamometer of the "Froude" water brake type.

Figure 2:
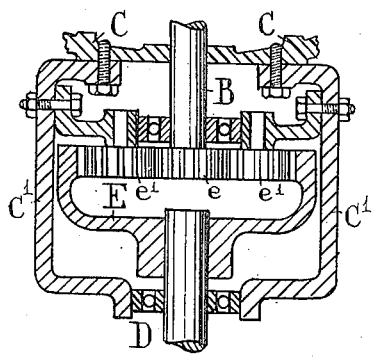
Figure 3:
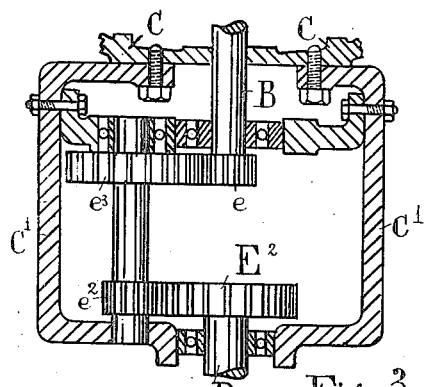

Figs. 2 and 3. are detail views of modified forms of gearing.

The dynamometer is of the ordinary "Froude" type with a rotor A mounted on a shaft B and provided with vanes or cups $a$ rotating inside a stator or casing C provided with corresponding cups or vanes $c$ adjustable sluices $c'$ being provided between the cups or vanes $a$ of the rotor A and those of the stator or casing C.

The casing C is restrained from rotating by heavy cast iron weights suspended at the end of a lever and attached to weighing apparatus, or alternatively, the lever may pull direct on the weighing apparatus without the intervention or assistance of weights. Or the weights themselves may be constructed of known dimensions so that by suspending them on the end of the lever they exert a known effort from which the torque can be calculated. A second or primary shaft D to which the prime mover is connected through the coupling D' is mounted in ball bearings $d$ within an extension C' of the casing C, and a shaft $D^2$ co-axial with the shaft D is similarly mounted on the other side of the apparatus in ball bearings $d'$ carried in an extension $C^2$ of the casing C, so that the casing C can rotate about the shaft D except for the restraining force of the weights or registering apparatus applied thereto.

A toothed wheel E is mounted on the shaft D and gears with a pinion $e$ on the shaft B so that the speed of rotation of the shaft B of the dynamometer is greater than that of the shaft D to which the prime mover is connected. The wheel E and pinion $e$ are inclosed within the extension $c''$ of the casing C' and may rotate in an oil bath $e'$.

The proportions of the gears E and $e$ are of convenient size to transmit the power desired and at the same time increase the speed of the rotor as compared with the speed of the main shaft.

The shafts D and B may be connected together by pinions helical or other gears or by a chain and sprocket wheels.

In this way when the power of the prime mover is developed at a slow rate of speed it can be absorbed by the dynamometer without the latter having to be constructed of excessively large dimensions and since the shaft D connected to the prime mover is carried in the casing C, the casing can swivel thereon and any frictional resistance in the bearing will consequently be duly registered on the weighing or other registering apparatus.

Instead of the shafts B and D being parallel they may be arranged co-axial and the power transmitted from the shaft D to the rotor shaft B of the dynamometer through double spur gear or through epicyclic gearing, as shown in Figs. 2 and 3. In the form shown in Fig. 2 the shaft D coupled to the prime mover has keyed to it a wheel E' with internal teeth which gear with the pinion $e$ on the rotor shaft B through the gear wheels $e'$. In the form shown in Fig. 3 the shaft D has a wheel $E^2$ thereon which gears with the pinion $e$ on the shaft B through the gears $e^2$ and $e^3$. The casing C C' swivels about the shaft D.

Although described with reference to a hydraulic dynamometer the invention is equally applicable to electric or solid friction brakes where the power is developed in the prime mover at a low speed of rotation.

What I claim as my invention and desire to protect by Letters Patent is:—

1. In a rotary absorption dynamometer, a shaft having a rotor mounted thereon, a primary shaft adapted to be operatively connected to the shaft of the device to be tested, connecting means between the said rotor and primary shafts, the speed of the rotor shaft being greater than the speed of the primary shaft, and a casing in which the rotor and primary shafts and connecting means between the latter are mounted, the casing being rotatable around the axis of the primary shaft and operating to transmit any frictional resistance imposed by the connecting means between the two shafts.

2. In a rotary absorption dynamometer, a casing, a rotor mounted in said casing, said casing adapted to contain an absorption element, a shaft upon which the rotor is mounted, a primary shaft mounted within the casing, the casing being rotatable about the latter shaft, and gears connecting the primary shaft with the rotor shaft, said gears also being mounted within the casing and whereby any frictional resistance imposed by the gears is transmitted to the registering device from the casing.

3. In a rotary absorption dynamometer, the combination with a casing to contain an absorption element, a rotor within the casing, of an auxiliary casing connected to the first named casing, a primary shaft rotating in the auxiliary casing, and gears connecting the primary shaft to the rotor shaft and also disposed in the auxiliary casing and whereby all frictional resistance within the apparatus is transmitted to the registering device.

Dated this 21st day of September 1916.

In testimony whereof I have hereunto set my hand in presence of two subscribing witnesses.

GEORGE HENRY WALKER.

Witnesses:
ERNEST HARKER,
KATHLEEN M. THOMPSON.